United States Patent
Ehrmann

(10) Patent No.: US 11,342,845 B2
(45) Date of Patent: May 24, 2022

(54) METHOD FOR SWITCHING A BI-DIRECTIONAL VOLTAGE CONVERTER

(71) Applicant: Vitesco Technologies GmbH, Hannover (DE)

(72) Inventor: Martin Ehrmann, Munich (DE)

(73) Assignee: VITESCO TECHNOLOGIES GERMANY GMBH, Hannover (DE)

( * ) Notice: Subject to any disclaimer, the term of this patent is extended or adjusted under 35 U.S.C. 154(b) by 52 days.

(21) Appl. No.: 16/772,966

(22) PCT Filed: Dec. 6, 2018

(86) PCT No.: PCT/EP2018/083780
§ 371 (c)(1),
(2) Date: Jun. 15, 2020

(87) PCT Pub. No.: WO2019/115341
PCT Pub. Date: Jun. 20, 2019

(65) Prior Publication Data
US 2021/0006162 A1    Jan. 7, 2021

(30) Foreign Application Priority Data

Dec. 14, 2017    (DE) .................. 10 2017 222 697.8
Jul. 10, 2018    (DE) .................. 10 2018 211 411.0

(51) Int. Cl.
*H02M 3/158*    (2006.01)
*H02M 1/08*     (2006.01)
*H02M 1/00*     (2006.01)

(52) U.S. Cl.
CPC ........... *H02M 3/1582* (2013.01); *H02M 1/08* (2013.01); *H02M 1/0058* (2021.05)

(58) Field of Classification Search
CPC .... H02M 3/1582; H02M 1/08; H02M 1/0058; Y02B 70/10
See application file for complete search history.

(56) References Cited

U.S. PATENT DOCUMENTS

| 5,734,258 A | 3/1998 | Esser ........................... 323/224 |
| 6,489,888 B1 | 12/2002 | Honeck ........................ 340/442 |

(Continued)

FOREIGN PATENT DOCUMENTS

| CN | 105186898 | 12/2015 | ............ H02M 7/483 |
| CN | 205387048 | 7/2016 | ............ B60C 23/04 |

(Continued)

OTHER PUBLICATIONS

Search Report for International Application No. PCT/EP2018/083780, 12 pages, dated Feb. 28, 2019.

(Continued)

*Primary Examiner* — Kyle J Moody
*Assistant Examiner* — Jye-June Lee
(74) *Attorney, Agent, or Firm* — Slayden Grubert Beard PLLC

(57) ABSTRACT

Various embodiments include a method for operating a bidirectional voltage converter with an input-side half-bridge, an output-side half-bridge, and a bridge branch having a bridge inductance, comprising: determining an actual mean bridge current value flowing through the bridge branch during a respective subsequent switching cycle T1 of the transistor switches in a respective current switching cycle T0; determining switch-on time points and switch-on durations of the respective transistor switches for the respective subsequent switching cycle T1; and switching on the respective transistor switches at the respective ascertained switch-on time points and for the respective ascertained switch-on durations in the respective subsequent switching cycle T1.

11 Claims, 1 Drawing Sheet

(56) References Cited

U.S. PATENT DOCUMENTS

| | | | |
|---|---|---|---|
| 7,394,231 B2 | 7/2008 | Flatness | 323/259 |
| 7,414,523 B2 | 8/2008 | Kleinschmidt | 250/504 R |
| 7,869,226 B2 | 1/2011 | Sirio | 363/17 |
| 7,869,237 B1 | 1/2011 | Schutten | 363/132 |
| 7,969,754 B2 | 6/2011 | Radecker | 363/21.03 |
| 8,669,744 B1 | 3/2014 | Vinciarelli | 323/235 |
| 9,407,150 B2 | 8/2016 | Jacobson | |
| 9,627,971 B2 | 4/2017 | Pavlovsky | |
| 9,673,711 B2 * | 6/2017 | Fishelov | H02M 3/157 |
| 9,923,466 B2 * | 3/2018 | Yu | H02M 1/14 |
| 10,298,131 B2 * | 5/2019 | Yu | H02M 3/1582 |
| 2008/0259645 A1 | 12/2008 | Herty | 363/17 |
| 2011/0188269 A1 | 8/2011 | Hosotani | 363/21.06 |
| 2015/0131347 A1 | 5/2015 | Kulka | 363/98 |
| 2016/0087545 A1 | 3/2016 | Higaki | 363/17 |

FOREIGN PATENT DOCUMENTS

| | | | | |
|---|---|---|---|---|
| DE | 10 2013 218 228 | | 3/2015 | H02M 3/158 |
| DE | 10 2015 219 580 | | 4/2017 | B32B 37/06 |

OTHER PUBLICATIONS

Office Action for DE Patent Application No. 10 2018 211 411.0, 7 pages, dated Feb. 18, 2019.

* cited by examiner

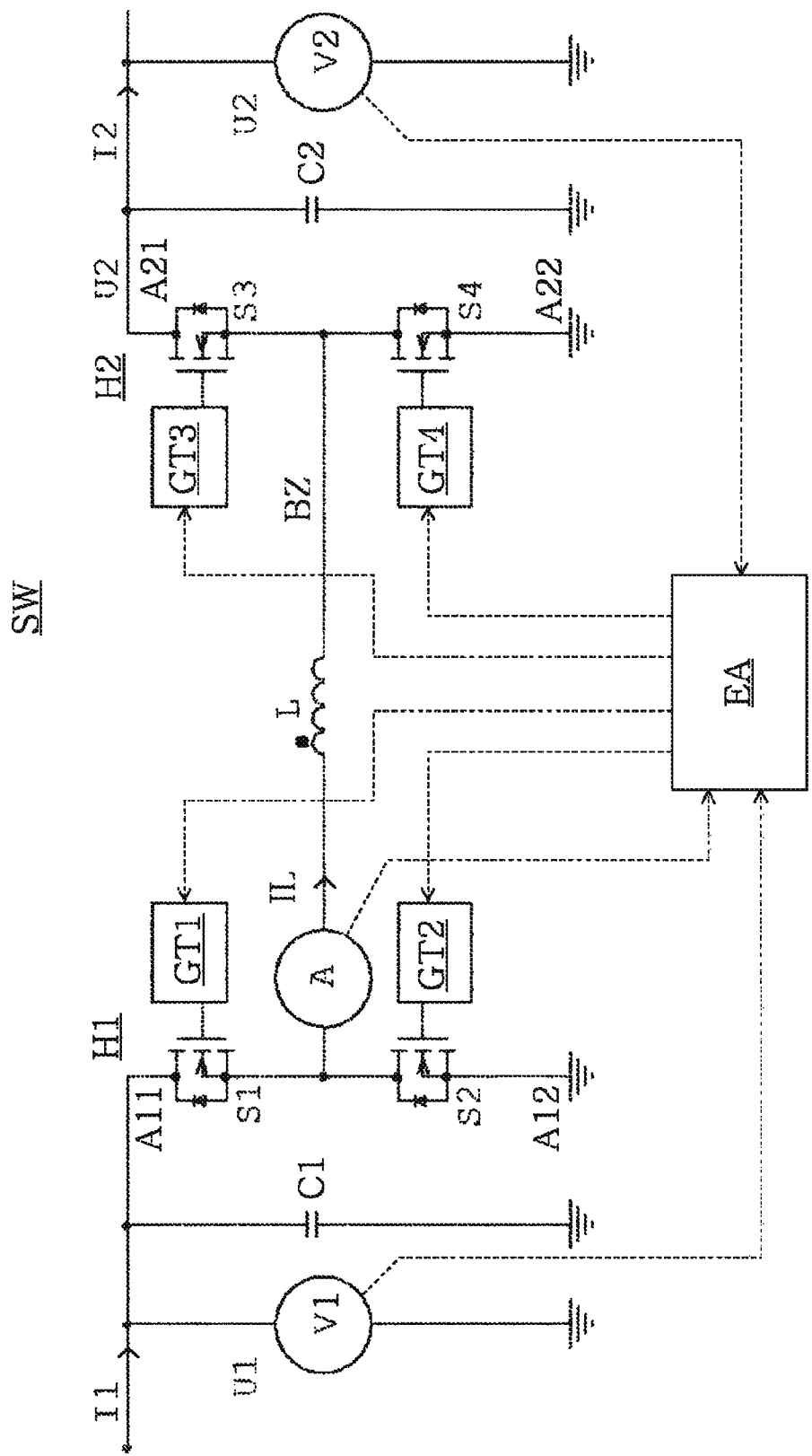

METHOD FOR SWITCHING A BI-DIRECTIONAL VOLTAGE CONVERTER

CROSS-REFERENCE TO RELATED APPLICATIONS

This application is a U.S. National Stage Application of International Application No. PCT/EP2018/083780 filed Dec. 6, 2018, which designates the United States of America, and claims priority to DE Application No. 10 2018 211 411.0 filed Jul. 10, 2018 and DE Application No. 10 2017 222 697.8 filed Dec. 14, 2017, the contents of which are hereby incorporated by reference in their entirety.

TECHNICAL FIELD

The present disclosure relates to voltage converters. Various embodiments may include methods for operating a bidirectional voltage converter and/or bidirectional voltage converters.

BACKGROUND

Voltage converters for bidirectional voltage conversion with H-bridges are used inter alia in the automobile sector. There is a general demand for the voltage converters to be operated with power losses as low as possible.

SUMMARY

The teachings of the present disclosure describe a way in which the power loss of a bidirectional voltage converter can be reduced. For example, some embodiments of the teachings herein include a method for the operation of a bidirectional voltage converter (SW) that comprises an input-side half-bridge circuit (H1) with respectively a positive-voltage-side (S1) and a negative-voltage-side (S2) transistor switch connected in series with one another, an output-side half-bridge circuit (H2) with respectively a positive-voltage-side (S3) and a negative-voltage-side (S4) transistor switch connected in series with one another, and a bridge branch (BZ) with a bridge inductance (L); wherein for a respective subsequent switching cycle T1 of the transistor switches (S1, S2, S3, S4) in a respective current switching cycle T0, an actual mean bridge current value IL_avg_mess of a bridge current (IL) flowing through the bridge branch (BZ) is ascertained; wherein with the actual mean bridge current value IL_avg_mess ascertained switch-on time points and switch-on durations of the respective transistor switches (S1, S2, S3, S4) for the respective subsequent switching cycle T1 are ascertained; wherein the respective transistor switches (S1, S2, S3, S4) are switched on at the respective ascertained switch-on time points and for the respective ascertained switch-on durations in the respective subsequent switching cycle T1.

In some embodiments, the switch-on time points and the switch-on durations are furthermore ascertained with a predefined mean setpoint bridge current value IL_avg_soll.

In some embodiments, a current difference ΔI between the ascertained actual mean bridge current value IL_avg_mess and the specified mean setpoint bridge current value IL_avg_soll is calculated, and a duty cycle correction value ΔDC is calculated with the current difference ΔI, and the switch-on time points and the switch-on durations are furthermore ascertained with the calculated duty cycle correction value ΔDC.

In some embodiments, an instantaneous bridge current value Istart1a, Istart1b; Istart2a, Istart2b; Istart3a, Istart3b of the bridge current (IL) is furthermore ascertained in the respective current switching cycle T0, which bridge current should flow through the bridge branch (BZ) at the time at which one of the transistor switches (S1, S2, S3, S4) is switched over from a switched-on state into a switched-off state; and the switch-on time points and the switch-on durations are furthermore ascertained with the ascertained instantaneous bridge current value Istart1a, Istart1b; Istart2a, Istart2b; Istart3a, Istart3b.

In some embodiments, the instantaneous bridge current value Istart1a, Istart1b; Istart2a, Istart2b; Istart3a, Istart3b is ascertained from the bridge inductance (L) and the charge transfer capacitances of the transistor switches (S1, S2, S3, S4).

In some embodiments, with the instantaneous bridge current value Istart1a, Istart1b; Istart2a, Istart2b; Istart3a, Istart3b a period duration is ascertained in the respective subsequent switching cycle T1, and the transistor switches (S1, S2, S3, S4) are switched on or off in the respective subsequent switching cycle T1 for the ascertained period duration.

In some embodiments, the period duration is furthermore ascertained with the actual mean bridge current value IL_avg_mess.

In some embodiments, an input voltage U1 is measured at the input-side half-bridge circuit (H1) and an output voltage U2 is measured at the output-side half-bridge circuit (H2) in the respective current switching cycle T0; the input voltage U1 and the output voltage U2 are compared with one another; and the switch-on time points, the switch-on durations and/or the period duration are ascertained depending on the result of the comparison between the input voltage U1 and the output voltage U2.

In some embodiments, with a relationship between the measured input voltage U1 and the measured output voltage U2: U2>k1*U1, wherein k1>1, in particular k1=1.2, in the subsequent switching cycle T1, the positive-voltage-side transistor switch (S1) of the input-side half-bridge circuit (H1) is switched on continuously (continuously switched 'high'); the negative-voltage-side transistor switch (S2) of the input-side half-bridge circuit (H1) is switched off continuously (continuously switched 'low'); the negative-voltage-side transistor switch (S4) of the output-side half-bridge circuit (H2) is switched on from the beginning of switching cycle T1 for a first switch-on duration tein_S4, and switched off for the remaining time of the period duration Tper of the subsequent switching cycle T1; and the positive-voltage-side transistor switch (S3) of the output-side half-bridge circuit (H2) is switched off from the beginning of switching cycle T1 for the first switch-on duration tein_S4, and switched on for the remaining time of the period duration Tper of the subsequent switching cycle T1; wherein for the first switch-on duration tein_S4 the following apply:

$$\text{tein\_S4} = \frac{2 \cdot L \cdot (Istart1a - IL\_avg\_soll) \cdot [U2 \cdot (1 + \Delta DC) - U1]}{U1 \cdot (U1 - U2)},$$

with IL_avg_soll>=0 amperes, or $$\text{tein\_S4} = \frac{2 \cdot L \cdot (Istart1b - IL\_avg\_soll) \cdot [U1 - U2 \cdot (1 + \Delta DC)]}{U1 \cdot (U1 - U2)},$$

with IL_avg_soll<0 amperes.

In some embodiments, the period duration Tper for the respective subsequent switching cycle T1 is ascertained on the basis of the following equations:

$$Tper = \frac{2 \cdot L \cdot U2 \cdot (Istart1a - IL\_avg\_soll)}{U1 \cdot (U1 - U2)},$$

with IL_avg_soll>=0 amperes, or $$Tper = \frac{2 \cdot L \cdot U2 \cdot (IL\_avg\_soll - Istart1b)}{U1 \cdot (U1 - U2)},$$

with IL_avg_soll<0 amperes.

In some embodiments, with a relationship between the measured input voltage U1 and the measured output voltage U2: k2*U1<=U2<=k1*U1, where k2<=1, in particular k2=0.8, and k1>=1, in particular k1=1.2, that in the subsequent switching cycle T1, the positive-voltage-side transistor switch (S1) of the input-side half-bridge circuit (H1) and the negative-voltage-side transistor switch (S4) of the output-side half-bridge circuit (H2) are switched on from the beginning of switching cycle T1 for a second switch-on duration tein_S4, and are switched off for the remaining time of the period duration Tper of the subsequent switching cycle T1, the negative-voltage-side transistor switch (S2) of the input-side half-bridge circuit (H1) and the positive-voltage-side transistor switch (S3) of the output-side half-bridge circuit (H2) are switched off from the beginning of switching cycle T1 for the second switch-on duration tein_S4, and are switched on for the remaining time of the period duration Tper of the subsequent switching cycle T1, wherein for the second switch-on duration tein_S4 the following apply:

$$tein\_S4 = \frac{2 \cdot L \cdot (IL\_avg\_soll - Istart2a) \cdot [U2 + (U1 + U2) \cdot \Delta DC]}{U1 \cdot U2},$$

with IL_avg_soll>=0 amperes, or $$tein\_S4 = \frac{2 \cdot L \cdot [(U1 + U2) \cdot \Delta DC + U2] \cdot (Istart2b - IL\_avg\_soll)}{U1 \cdot U2},$$

with IL_avg_soll<0 amperes.

In some embodiments, the period duration Tper for the respective subsequent switching cycle T1 is ascertained on the basis of the following equations:

$$Tper = \frac{2 \cdot L \cdot (IL\_avg\_soll - Istart2a) \cdot (U1 + U2)}{U1 \cdot U2},$$

with IL_avg_soll>=0 amperes, or $$Tper = \frac{2 \cdot L \cdot (Istart2b - IL\_avg\_soll) \cdot (U1 + U2)}{U1 \cdot U2},$$

with IL_avg_soll<0 amperes.

In some embodiments, with a relationship between the measured input voltage U1 and the measured output voltage U2: U2<k2*U1, where k2<1, in particular k2=0.8, that in the subsequent switching cycle T1, the positive-voltage-side transistor switch (S3) of the output-side half-bridge circuit (H2) is switched on continuously (continuously switched 'high'), the negative-voltage-side transistor switch (S4) of the output-side half-bridge circuit (H2) is switched off continuously (continuously switched 'low'), the positive-voltage-side transistor switch (S1) of the input-side half-bridge circuit (H1) is switched on from the beginning of switching cycle T1 for a third switch-on duration tein_S1, and is switched off for the remaining time of the period duration Tper of the subsequent switching cycle T1, and the negative-voltage-side transistor switch (S2) of the input-side half-bridge circuit (H1) is switched off from the beginning of switching cycle T1 for the third switch-on duration tein_S1, and is switched on for the remaining time of the period duration Tper of the subsequent switching cycle T1, wherein for the third switch-on duration tein_S1 the following apply:

$$tein\_S1 = \frac{2 \cdot L \cdot (IL\_avg\_soll - Istart3a) \cdot (U1 \cdot \Delta DC + U2)}{U2 \cdot (U1 - U2)},$$

with IL_avg_soll>=0 amperes, or $$tein\_S1 = \frac{2 \cdot L \cdot (Istart3b - IL\_avg\_soll) \cdot (U1 \cdot \Delta DC + U2)}{U2 \cdot (U1 - U2)},$$

with IL_avg_soll<0 amperes.

In some embodiments, the period duration Tper for the respective subsequent switching cycle T1 is ascertained on the basis of the following equations:

$$Tper = \frac{2 \cdot L \cdot U1 \cdot (Istart3a - IL\_avg\_soll)}{U2 \cdot (U2 - U1)},$$

with IL_avg_soll>=0 amperes, or $$Tper = \frac{2 \cdot L \cdot U1 \cdot (IL\_avg\_soll - Istart3b)}{U2 \cdot (U2 - U1)},$$

with IL_avg_soll<0 amperes.

As another example, some embodiments include a voltage converter (SW) for bidirectional voltage conversion, comprising: an input-side half-bridge circuit (H1) with respectively a positive-voltage-side (S1) and a negative-voltage-side (S2) transistor switch connected in series with one another; an output-side half-bridge circuit (H2) with respectively a positive-voltage-side (S3) and a negative-voltage-side (S4) transistor switch connected in series with one another; a bridge branch (BZ) with a bridge inductance (L); a measuring arrangement (A, V1, V2) that is configured to measure a bridge current (IL) flowing through the bridge branch (BZ) over the entire current switching cycle T0 for a respective subsequent switching cycle T1 of the transistor switches (S1, S2, S3, S4) during a respective current switching cycle T0; an ascertainment arrangement (EA) that is configured to ascertain an actual mean bridge current value IL_avg_mess from the measured bridge current (IL) and to ascertain switch-on time points and switch-on durations of the respective transistor switches (S1, S2, S3, S4) for the respective subsequent switching cycle T1 from the actual mean bridge current value IL_avg_mess; a control arrangement (GT1, GT2, GT3, GT4) that is configured to switch the respective transistor switches (S1, S2, S3, S4) on at the respective ascertained switch-on time points and for the respective ascertained switch-on durations in the respective subsequent switching cycle T1.

BRIEF DESCRIPTION OF THE DRAWINGS

The FIGURE illustrates an embodiment of the teachings herein, which are then explained in greater detail below with reference to the drawing. The figure shows a schematic illustration of a bidirectional H-bridge voltage converter SW incorporating teachings of the present disclosure.

DETAILED DESCRIPTION

In some embodiments, there is a method for the operation of a bidirectional voltage converter, in particular of a bidirectional DC voltage converter, that comprises an input-side half-bridge circuit with respectively a positive-voltage-side and a negative-voltage-side transistor switch connected in series with one another, an output-side half-bridge circuit with respectively a positive-voltage-side and a negative-voltage-side transistor switch connected in series with one another, and a bridge branch between center taps of the two half-bridge circuits with a bridge inductance L or in the form of a coil.

In some embodiments, for a respective subsequent switching cycle T1 of the transistor switches in a respective current switching cycle T0, an actual mean bridge current value IL_avg_mess of a bridge current flowing through the bridge branch in the respective current switching cycle T0 is measured or ascertained. The actual mean bridge current value IL_avg_mess here is the arithmetic mean value of the bridge current measured in the current switching cycle T0. With (or on the basis of) the ascertained actual mean bridge current value IL_avg_mess, switch-on time points and switch-on durations of the respective transistor switches for the respective subsequent switching cycle T1 are then ascertained. The respective transistor switches are then switched on at the respective ascertained switch-on time points and for the respective ascertained switch-on durations in the respective subsequent switching cycle T1.

In some embodiments, the switching losses in the transistor switches represent a preponderant proportion of the total power loss in a voltage converter. To reduce the total power loss, the switching losses at all the working points of the voltage converter should be reduced or largely eliminated as far as possible. Since the working points are in turn dependent on the bridge current, the bridge current is employed for the ascertainment of the switch-on time points and the switch-on durations. Since the bridge current in turn changes over the whole of the switching cycle, an actual mean bridge current value IL_avg_mess is employed for the ascertainment. The switch-on time points and switch-on durations ascertained on the basis of this actual mean bridge current value IL_avg_mess ensure that when one of the transistors is switched off, a bridge current with a previously defined instantaneous current value flows through the bridge inductance, which guarantees a natural commutation to a transistor switch whose potential is opposite to that of the transistor switch that is to be switched off. The switching-on of each of the transistor switches here always takes place after natural commutation has occurred, when the voltage present at the respective transistor switch that is to be switched on ("zero voltage switching") is approximately 0 V. The method here ensures the "zero voltage switching" independently of the input voltage, the output voltage, the current direction and the current magnitude. These teachings describe one way of reducing the power loss of a bidirectional voltage converter.

In some embodiments, the transistor switches are switched on and off with pulse-width-modulated signals, and with changeable signal periods. The switch-on time points and the switch-on durations are, for example, furthermore ascertained with a predefined mean setpoint bridge current value IL_avg_soll. The mean setpoint bridge current value IL_avg_soll here is a mean value of the bridge current that should flow through the bridge branch, i.e. through the bridge inductance, during the switching cycle T1. The mean setpoint bridge current value IL_avg_soll is specified here as the controlled variable, or ascertained and specified from controlled variables and measured variables, in particular from input and output voltages of the voltage regulator U1, U2.

For example, a current difference $\Delta I$ between the ascertained actual mean bridge current value IL_avg_mess and the specified mean setpoint bridge current value IL_avg_soll is calculated, where: $\Delta I = IL\_avg\_soll - IL\_avg\_mess$. A duty cycle correction value $\Delta DC$ is then calculated from the current difference $\Delta I$. The switch-on time points and the switch-on durations are then furthermore ascertained from the calculated duty cycle correction value $\Delta DC$.

In some embodiments, an instantaneous bridge current value Istart1a, Istart1b; Istart2a, Istart2b; Istart3a, Istart3b of the bridge current is furthermore measured or ascertained in the respective current switching cycle T0, which bridge current should flow through the bridge branch at the time at which one of the transistor switches is switched over from a switched-on state into a switched-off state. The switch-on time points and the switch-on durations are then furthermore ascertained with the ascertained instantaneous bridge current value Istart1a, Istart1b; Istart2a, Istart2b; Istart3a, Istart3b. The instantaneous bridge current value here in particular always has a different arithmetic sign from the mean setpoint bridge current value. The instantaneous bridge current value here is a momentary value that is achieved in the current switching cycle T0 immediately before switching one of the transistor switches off in order to ensure the natural commutation.

In some embodiments, the instantaneous bridge current value Istart1a, Istart1b; Istart2a, Istart2b; Istart3a, Istart3b is, for example, ascertained from the bridge inductance L and the charge transfer capacitances of the transistor switches. With the instantaneous bridge current value Istart1a, Istart1b; Istart2a, Istart2b; Istart3a, Istart3b, the switch-on and switch-off time points of the transistor switches for the subsequent switching cycle T1 are ascertained. A period duration Tper here is the sum of the time duration from the respective switch-on and switch-off duration of the respective individual transistor switches. The period duration is, for example, furthermore ascertained with the actual mean bridge current value IL_avg_mess.

In some embodiments, an input voltage U1 is measured at the input-side half-bridge circuit and an output voltage U2 is measured at the output-side half-bridge circuit in the respective current switching cycle T0. The measured input and output voltage U1, U2 are then compared to one another. The switch-on time points, the switch-on durations and/or the period duration are then, for example, furthermore ascertained depending on the result of the comparison between the input voltage U1 and the output voltage U2. In some embodiments, the instantaneous bridge current value Istart1a, Istart1b; Istart2a, Istart2b; Istart3a, Istart3b is for example ascertained in addition to the bridge inductance L and the charge transfer capacitances of the transistor switches, for example also from the input and the output voltage U1, U2.

Case 1:
With a ratio between the measured input voltage U1 and the measured output voltage U2, wherein:
U2>k1*U1, with k1>1, in particular k1=1.2, in the subsequent switching cycle for example:
  the positive-voltage-side transistor switch of the input-side half-bridge circuit is switched on continuously (i.e. continuously switched "high");
  the negative-voltage-side transistor switch of the input-side half-bridge circuit is switched off continuously (i.e. continuously switched "low");
  the negative-voltage-side transistor switch of the output-side half-bridge circuit is switched on from the beginning of switching cycle T1 for a first switch-on duration tein_S4, and switched off for the remaining time of the period duration Tper of the subsequent switching cycle T1; and
  the positive-voltage-side transistor switch of the output-side half-bridge circuit is switched off from the beginning of switching cycle T1 for the first switch-on duration tein_S4, and switched on for the remaining time of the period duration Tper of the subsequent switching cycle T1.

The following applies to the first switch-on duration tein_S4:

$$\text{tein\_S4} = \frac{2 \cdot L \cdot (Istart1a - IL\_avg\_soll) \cdot [U2 \cdot (1 + \Delta DC) - U1]}{U1 \cdot (U1 - U2)},$$

with IL_avg_soll>=0 amperes (wherein the specified instantaneous bridge current value Istart1a is less than 0 amperes (or has a different arithmetic sign from the specified mean setpoint bridge current value IL_avg_soll) and is reached when switching off the positive-voltage-side transistor switch of the output-side half-bridge circuit), or $$\text{tein\_S4} = \frac{2 \cdot L \cdot (Istart1b - IL\_avg\_soll) \cdot [U1 - U2 \cdot (1 + \Delta DC)]}{U1 \cdot (U1 - U2)},$$

with IL_avg_soll<0 amperes (wherein the specified instantaneous bridge current value Istart1b is greater than 0 amperes (or has a different arithmetic sign from the specified mean setpoint bridge current value IL_avg_soll) and is reached when switching off the negative-voltage-side transistor switch of the output-side half-bridge circuit).

In some embodiments, the period duration Tper for the respective subsequent switching cycle T1 is ascertained in case 1, for example, on the basis of the following equations:

$$Tper = \frac{2 \cdot L \cdot U2 \cdot (Istart1a - IL\_avg\_soll)}{U1 \cdot (U1 - U2)},$$

with IL_avg_soll>=0 amperes, or $$Tper = \frac{2 \cdot L \cdot U2 \cdot (IL\_avg\_soll - Istart1b)}{U1 \cdot (U1 - U2)},$$

with IL_avg_soll<0 amperes.

Case 2:
With a ratio between the measured input voltage U1 and the measured output voltage U2, wherein:
k2*U1<=U2<=k1*U1, with k1>1, in particular k1=1.2, and k2<1, in particular k2=0.8, in the subsequent switching cycle for example:
  the positive-voltage-side transistor switch of the input-side half-bridge circuit and the negative-voltage-side transistor switch of the output-side half-bridge circuit are switched on from the beginning of switching cycle T1 for a second switch-on duration tein_S4, and switched off for the remaining time of the period duration Tper of the subsequent switching cycle T1; and
  the negative-voltage-side transistor switch of the input-side half-bridge circuit and the positive-voltage-side transistor switch of the output-side half-bridge circuit are switched off from the beginning of switching cycle T1 for the second switch-on duration tein_S4, and switched on for the remaining time of the period duration Tper of the subsequent switching cycle T1.

The following applies to the second switch-on duration tein_S4:

$$\text{tein\_S4} = \frac{2 \cdot L \cdot (IL\_avg\_soll - Istart2a) \cdot [U2 + (U1 + U2) \cdot \Delta DC]}{U1 \cdot U2},$$

with IL_avg_soll>=0 amperes (wherein the specified instantaneous bridge current value Istart2a is less than 0 amperes (or has a different arithmetic sign from the specified mean setpoint bridge current value IL_avg_soll) and is reached when switching off the negative-voltage-side transistor switch of the input-side half-bridge circuit and the positive-voltage-side transistor switch of the output-side half-bridge circuit), or $$\text{tein\_S4} = \frac{2 \cdot L \cdot [(U1 + U2) \cdot \Delta DC + U2] \cdot (Istart2b - IL\_avg\_soll)}{U1 \cdot U2},$$

with IL_avg_soll<0 amperes (wherein the specified instantaneous bridge current value Istart2b is greater than 0 amperes (or has a different arithmetic sign from the specified mean setpoint bridge current value IL_avg_soll) and is reached when switching off the positive-voltage-side transistor switch of the input-side half-bridge circuit and the negative-voltage-side transistor switch of the output-side half-bridge circuit).

The period duration Tper for the respective subsequent switching cycle T1 is ascertained in case 2, for example, on the basis of the following equations:

$$Tper = \frac{2 \cdot L \cdot (IL\_avg\_soll - Istart2a) \cdot (U1 + U2)}{U1 \cdot U2},$$

with IL_avg_soll>=0 amperes, or $$Tper = \frac{2 \cdot L \cdot (Istart2b - IL\_avg\_soll) \cdot (U1 + U2)}{U1 \cdot U2},$$

with IL_avg_soll<0 amperes.

Case 3:

With a ratio between the measured input voltage U1 and the measured output voltage U2, wherein:

U2<k2*U1, with k2<1, in particular k2=0.8, in the subsequent switching cycle for example:

- the positive-voltage-side transistor switch of the output-side half-bridge circuit is switched on continuously (i.e. continuously switched "high");
- the negative-voltage-side transistor switch of the output-side half-bridge circuit is switched off continuously (i.e. continuously switched "low");
- the positive-voltage-side transistor switch of the output-side half-bridge circuit is switched on from the beginning of switching cycle T1 for a third switch-on duration tein_S1, and switched off for the remaining time of the period duration Tper of the subsequent switching cycle T1; and
- the negative-voltage-side transistor switch of the input-side half-bridge circuit is switched off from the beginning of switching cycle T1 for the third switch-on duration tein_S1, and switched on for the remaining time of the period duration Tper of the subsequent switching cycle T1.

The following applies to the third switch-on duration tein_S1:

$$\text{tein\_S1} = \frac{2 \cdot L \cdot (\text{IL\_avg\_soll} - \text{Istart3a}) \cdot (U1 \cdot \Delta DC + U2)}{U2 \cdot (U1 - U2)},$$

with IL_avg_soll>=0 amperes (wherein the specified instantaneous bridge current value Istart3a is less than 0 amperes (or has a different arithmetic sign from the specified mean setpoint bridge current value IL_avg_soll) and is reached when switching off the negative-voltage-side transistor switch of the input-side half-bridge circuit), or $$\text{tein\_S1} = \frac{2 \cdot L \cdot (\text{Istart3b} - \text{IL\_avg\_soll}) \cdot (U1 \cdot \Delta DC + U2)}{U2 \cdot (U1 - U2)},$$

with IL_avg_soll<0 amperes (wherein the specified instantaneous bridge current value Istart3b is greater than 0 amperes (or has a different arithmetic sign from the specified mean setpoint bridge current value IL_avg_soll) and is reached when switching off the positive-voltage-side transistor switch of the input-side half-bridge circuit).

The period duration Tper for the respective subsequent switching cycle T1 is ascertained in case 3, for example, on the basis of the following equations:

$$Tper = \frac{2 \cdot L \cdot U1 \cdot (\text{Istart3a} - \text{IL\_avg\_soll})}{U2 \cdot (U2 - U1)},$$

with IL_avg_soll>=0 amperes, or $$Tper = \frac{2 \cdot L \cdot U1 \cdot (\text{IL\_avg\_soll} - \text{Istart3b})}{U2 \cdot (U2 - U1)},$$

with IL_avg_soll<0 amperes.

In some embodiments, there is a voltage converter, in particular a DC voltage converter, for bidirectional voltage conversion. The voltage converter may comprise an input-side half-bridge circuit each with a positive-voltage side and a negative-voltage side transistor switch connected in series with one another. In some embodiments, the voltage converter further comprises an output-side half-bridge circuit each with a further positive-voltage-side and a further negative-voltage-side transistor switch connected in series with one another. In some embodiments, the voltage converter also comprises a bridge branch between center taps of the two half-bridge circuits with a bridge inductance L, or in the form of a coil.

In some embodiments, the voltage converter further comprises a measuring arrangement that is configured to measure a bridge current flowing through the bridge branch over the entire current switching cycle for a respective subsequent switching cycle of the four transistor switches (the two half-bridge circuits) in a respective current switching cycle. In some embodiments, the voltage converter further comprises an ascertainment arrangement that is configured to ascertain an actual mean bridge current value IL_avg_mess from the measured bridge current and to ascertain switch-on time points and switch-on durations of the respective transistor switches for the respective subsequent switching cycle T1 from the actual mean bridge current value IL_avg_mess.

In some embodiments, the voltage converter comprises in addition a control arrangement that is configured to switch the respective transistor switches on at the respective ascertained switch-on time points and for the respective ascertained switch-on durations in the respective subsequent switching cycle T1. Various embodiments of the method described above can, when possible, be applied to the above-mentioned voltage converter and are also deemed to be advantageous embodiments of the voltage converter.

In some embodiments, the voltage converter SW is electrically connected at the current input side via two current input terminals A11, A12 to an input voltage U1 and on the current output side via two current output terminals A21, A22 to an output voltage U2. The voltage converter SW is used for bidirectional voltage conversion between the input and output voltages U1, U2. In some embodiments, the voltage converter SW comprises an input-side half-bridge circuit H1 with a respective positive-voltage-side and a negative-voltage-side transistor switch S1, S2 that are electrically connected in series with one another and between the two current input terminals A11, A12.

In some embodiments, the voltage converter SW further comprises an output-side half-bridge circuit H2 with a respective positive-voltage-side and a negative-voltage-side transistor switch S3, S4 that are electrically connected in series with one another and between the two current output terminals A21, A22. In some embodiments, the voltage converter SW further comprises a bridge branch BZ that electrically connects the two half-bridge circuits H1, H2, or their center taps, to one another. A bridge inductance L in the form of a coil is connected electrically in the bridge branch BZ.

In some embodiments, the voltage converter SW further comprises two capacitors C1 and C2 each of which is connected electrically between the two current input terminals A11, A12, and thus parallel to the input-side half-bridge circuit H1, or between the two current output terminals A21, A22, and thus parallel to the output-side half-bridge circuit H2. The capacitors C1 and C2 are used to smooth the input or output voltage U1, U2.

In some embodiments, the voltage converter SW further comprises a measuring arrangement that comprises an ammeter A and two voltmeters V1, V2. In some embodiments, the ammeter A is connected in the bridge branch BZ in series with the coil, and serves to measure a bridge current IL flowing through the bridge branch BZ. The two voltmeters V1, V2 are each connected between the two current input terminals A11, A12 or between the two current output terminals A21, A22, and are each used for measurement of the input or output voltage U1, U2 respectively.

In some embodiments, the voltage converter SW further comprises an ascertainment arrangement EA that is connected for signaling on the signal input side with signal outputs of the ammeter/voltmeters A, V1, V2. The ascertainment arrangement EA receives the measured values of the bridge current IL and of the two voltages U1, U2 from the ammeter/voltmeters A, V1, V2 via the signal connections. The ascertainment arrangement EA is further configured to ascertain period durations, switch-on time points and switch-on durations of the respective transistor switches S1, S2, S3, S4 for respective subsequent switching cycles on the basis of measured current and voltage values.

In some embodiments, the voltage converter SW further comprises a control arrangement for controlling the four transistor switches S1, S2, S3, S4. The control arrangement comprises four gate drivers GT1, GT2, GT3, GT4 for in each case driving one of the four transistor switches S1, S2, S3, S4. The gate drivers GT1, GT2, GT3, GT4 are each connected for signaling on the signal input side with one of four signal outputs of the ascertainment arrangement EA and on the control signal output side each with the control terminal of the respective transistor switches S1, S2, S3, S4. The gate drivers GT1, GT2, GT3, GT4 are configured to switch the respective transistor switches S1, S2, S3, S4 on and off in a controlled manner in the respective switching cycles on the basis of the period durations, switch-on time points and switch-on durations ascertained by the ascertainment arrangement EA.

After the switching topology of the voltage converter SW was described with reference to the figure, a method for driving the voltage converter SW, or the four transistor switches S1, S2, S3, S4, is described in more detail below:

In some embodiments, to begin with, the two voltmeters V1, V2 and the ammeter A measure the input voltage and the output voltage U1, U2 and the bridge current IL flowing through the bridge branch in the respective current switching cycle T0. In this case, the ammeter A measures the bridge current IL over the full duration of the current switching cycle T0.

In some embodiments, the ascertainment arrangement EA ascertains an actual mean bridge current value IL_avg_mess from the measured bridge current values. The ascertainment arrangement EA furthermore ascertains a mean setpoint bridge current value IL_avg_soll from the measured input and output voltages U1, U2 and from further controlled variables, and specifies this as the controlled variable. In some embodiments, the ascertainment arrangement EA calculates a current difference ΔI from the actual mean bridge current value IL_avg_mess and the specified mean setpoint bridge current value IL_avg_soll using the equation: ΔI=IL_avg_mess−IL_avg_soll. The ascertainment arrangement EA then calculates a duty cycle correction value ΔDC from the current difference ΔI.

In some embodiments, the ascertainment arrangement EA ascertains, from the bridge inductance L and the already-known charge transfer capacitances of the transistor switches S1, S2, S3, S4 as well as the input and output voltage U1, U2, an instantaneous bridge current value Istart1a, Istart1b, Istart2a, Istart2b, Istart3a or Istart3b that should flow through the bridge branch BZ at the moment at which one of the transistor switches S1, S2, S3, S4 is switched over from a switched-on state into a switched-off state.

In some embodiments, the ascertainment arrangement EA further compares the input and the output voltages U1, U2 with one another. Depending on the result of the comparison of the two voltages U1, U2, the ascertainment arrangement EA ascertains the period durations, switch-on time points and the switch-on durations of all four transistor switches S1, S2, S3, S4 for the subsequent switching cycle T1 as described below.

In some embodiments, the control arrangement, or the gate drivers GT1, GT2, GT3 and GT4 control the respective transistor switches S1, S2, S3, S4 on the basis of the ascertained period durations, switch-on time points and the switch-on durations in the respective subsequent switching cycle.

Case 1: the output voltage U2 is greater than the input voltage U1, where the following applies: U2>k1*U1, with k1>1, in particular k1=1.2. In this case, the transistor switches S1, S2, S3, S4 are driven as follows in the subsequent switching cycle T1:

- The positive-voltage-side transistor switch S1 of the input-side half-bridge circuit H1 is switched on continuously (continuously switched 'high').
- The negative-voltage-side transistor switch S2 of the input-side half-bridge circuit H1 is switched off continuously (continuously switched 'low').
- The negative-voltage-side transistor switch S4 of the output-side half-bridge circuit H2 is switched on from the beginning of switching cycle T1 for a first switch-on duration tein_S4, and switched off for the remaining time of the period duration Tper of the subsequent switching cycle T1.
- The positive-voltage-side transistor switch S3 of the output-side half-bridge circuit H2 is switched off from the beginning of switching cycle T1 for the first switch-on duration tein_S4, and switched on for the remaining time of the period duration Tper of the subsequent switching cycle T1.

The first switch-on duration tein_S4 is ascertained here on the basis of the following equations:

$$\text{tein\_S4} = \frac{2 \cdot L \cdot (Istart1a - \text{IL\_avg\_soll}) \cdot [U2 \cdot (1 + \Delta DC) - U1]}{U1 \cdot (U1 - U2)},$$

with IL_avg_soll>=0 amperes (i.e. the bridge current IL should flow from the input-side half-bridge circuit H1 into the output-side half-bridge circuit H2), or $$\text{tein\_S4} = \frac{2 \cdot L \cdot (Istart1b - \text{IL\_avg\_soll}) \cdot [U1 - U2 \cdot (1 + \Delta DC)]}{U1 \cdot (U1 - U2)},$$

with IL_avg_soll<0 amperes (i.e. the bridge current IL should flow from the output-side half-bridge circuit H2 into the input-side half-bridge circuit H1).

The period duration Tper is ascertained on the basis of the following equations:

$$Tper = \frac{2 \cdot L \cdot U2 \cdot (Istart1a - \text{IL\_avg\_soll})}{U1 \cdot (U1 - U2)},$$

with IL_avg_soll>=0 amperes, or $$Tper = \frac{2 \cdot L \cdot U2 \cdot (IL\_avg\_soll - Istart1b)}{U1 \cdot (U1 - U2)},$$

with IL_avg_soll<0 amperes.

Case 2: the output voltage U2 is approximately equal in magnitude to the input voltage U1, wherein the following applies: k2*U1<=U2<=k1*U1, with k1>1, in particular k1=1.2, and k2<1, in particular k2=0.8.

In this case, the transistor switches S1, S2, S3, S4 are driven as follows in the subsequent switching cycle T1:

The positive-voltage-side transistor switch S1 of the input-side half-bridge circuit H1 and the negative-voltage-side transistor switch S4 of the output-side half-bridge circuit H2 are switched on from the beginning of switching cycle T1 for a second switch-on duration tein_S4, and switched off for the remaining time of the period duration Tper of the subsequent switching cycle T1.

The negative-voltage-side transistor switch S2 of the input-side half-bridge circuit H1 and the positive-voltage-side transistor switch S3 of the output-side half-bridge circuit H2 are switched off from the beginning of switching cycle T1 for the second switch-on duration tein_S4, and switched on for the remaining time of the period duration Tper of the subsequent switching cycle T1.

The second switch-on duration tein_S4 is ascertained here on the basis of the following equations:

$$tein\_S4 = \frac{2 \cdot L \cdot (IL\_avg\_soll - Istart2a) \cdot [U2 + (U1 + U2) \cdot \Delta DC]}{U1 \cdot U2},$$

with IL_avg_soll>=0 amperes (i.e. the bridge current IL should flow from the input-side half-bridge circuit H1 into the output-side half-bridge circuit H2), or $$tein\_S4 = \frac{2 \cdot L \cdot [(U1 + U2) \cdot \Delta DC + U2] \cdot (Istart2b - IL\_avg\_soll)}{U1 \cdot U2},$$

with IL_avg_soll<0 amperes (i.e. the bridge current IL should flow from the output-side half-bridge circuit H2 into the input-side half-bridge circuit H1).

The period duration Tper is ascertained on the basis of the following equations:

$$Tper = \frac{2 \cdot L \cdot (IL\_avg\_soll - Istart2a) \cdot (U1 + U2)}{U1 \cdot U2},$$

with IL_avg_soll>=0 amperes, or $$Tper = \frac{2 \cdot L \cdot (Istart2b - IL\_avg\_soll) \cdot (U1 + U2)}{U1 \cdot U2},$$

with IL_avg_soll<0 amperes.

Case 3: the output voltage U2 is less than the input voltage U1, where the following applies: U2<k2*U1, with k2<1, in particular k2=0.8. In this case, the transistor switches S1, S2, S3, S4 are driven as follows in the subsequent switching cycle T1:

The positive-voltage-side transistor switch S3 of the output-side half-bridge circuit H2 is switched on continuously (continuously switched 'high').

The negative-voltage-side transistor switch S4 of the output-side half-bridge circuit H2 is switched off continuously (continuously switched 'low').

The positive-voltage-side transistor switch S1 of the input-side half-bridge circuit H1 is switched on from the beginning of switching cycle T1 for a third switch-on duration tein_S1, and switched off for the remaining time of the period duration Tper of the subsequent switching cycle T1.

The negative-voltage-side transistor switch S2 of the input-side half-bridge circuit H1 is switched off from the beginning of switching cycle T1 for the third switch-on duration tein_S1, and switched on for the remaining time of the period duration Tper of the subsequent switching cycle T1.

The third switch-on duration tein_S1 is ascertained here on the basis of the following equations:

$$tein\_S1 = \frac{2 \cdot L \cdot (IL\_avg\_soll - Istart3a) \cdot (U1 \cdot \Delta DC + U2)}{U2 \cdot (U1 - U2)},$$

with IL_avg_soll>=0 amperes (i.e. the bridge current IL should flow from the input-side half-bridge circuit H1 into the output-side half-bridge circuit H2), or $$tein\_S1 = \frac{2 \cdot L \cdot (Istart3b - IL\_avg\_soll) \cdot (U1 \cdot \Delta DC + U2)}{U2 \cdot (U1 - U2)},$$

with IL_avg_soll<0 amperes (i.e. the bridge current IL should flow from the output-side half-bridge circuit H2 into the input-side half-bridge circuit H1).

The period duration Tper is ascertained on the basis of the following equations:

$$Tper = \frac{2 \cdot L \cdot U1 \cdot (Istart3a - IL\_avg\_soll)}{U2 \cdot (U2 - U1)},$$

with IL_avg_soll>=0 amperes, or $$Tper = \frac{2 \cdot L \cdot U1 \cdot (IL\_avg\_soll - Istart3b)}{U2 \cdot (U2 - U1)},$$

with IL_avg_soll<0 amperes.

The previously described three cases thus cover the three ranges in which all the possible relationships between the input and output voltages U1, U2 apply: U2<U1, U2≈U1 or U2>U1.

The relationships IL_avg_soll>=0 amperes or IL_avg_soll<0 amperes indicate the intended current direction of the bridge current IL. The two factors k1 and k2 must be selected such that with the given voltage measurement accuracy of the input and output voltages U1 and U2 it is also ensured that the equation of case 2 is applied when U1=U2.

In some embodiments, the voltage converter SW can convert in all cases (bidirectionally) and with low power loss, in which one of the following relationships applies:

U1>U2, with IL_avg_soll>=0 or IL_avg_soll<0 (case 1);

U1=U2, with IL_avg_soll>=0 or IL_avg_soll<0 (case 2);

U1<U2, with IL_avg_soll>=0 or IL_avg_soll<0 (case 3);

In some embodiments, the voltage converter SW can be operated in ZVS (zero voltage switching) mode independently of the working point, i.e. independently of the voltage relationships, the current direction and the current magnitude, wherein the switching losses of the transistor switches S1, S2, S3 and S4 are largely eliminated at all working points of the voltage converter SW, and the power loss as a whole is reduced to a minimum.

Since the ammeter/voltmeters A, V1, V2, the gate drivers GT1, GT2, GT3, GT4, that carry out part of the method are already present per se as the components for regulation of the voltage converter SW, only the ascertainment arrangement EA is needed in addition to carry out the method. Since the ascertainment arrangement EA can also be functionally implemented in an already existing controller of the voltage converter SW, the voltage converter SW can be realized without additional circuit components and thus without additional construction space. Since the power loss as a whole is reduced, less effort is needed for cooling, and thus a cooling arrangement of correspondingly small dimensions is required for the voltage converter SW.

In some embodiments, the method described is applied in motor vehicles, in particular in hybrid electric and electric vehicles in which electrical power is intended to be transferred with low losses by means of one or a plurality of economical H-bridge voltage converters SW.

Examples for such applications include:
  boost converters for adapting an accumulator voltage to an inverter voltage (DC-DC application, i.e. conversion of an output voltage from a DC voltage source into a charging voltage for a DC sink);
  buck-boost converters for adapting an accumulator voltage to a voltage of a DC charging station (DC-DC application, i.e. conversion of an output voltage from a DC charging station into a charging voltage for an accumulator);
  buck-boost converters for adapting an AC charging station alternating voltage to an accumulator voltage (rectification, AC-DC application);
  buck-boost converters for adapting an accumulator voltage to a rated voltage of an AC operating means (e.g. an electric machine, DC-AC application).

The reduction in the switching power loss is achieved in particular in that, depending on the working point (input voltage U1, output voltage U2, actual bridge current and setpoint bridge current), the transistor switches S1, S2, S3, S4 of the half-bridge circuit H1, H2 are switched on for the respectively following switching cycle T1 for a calculated switch-on duration and switched off for a calculated switch-off duration. The calculation is in each case carried out here in such a way that when switching off one of the transistor switches S1, S2, S3, S4, a previously defined bridge current flows through the bridge inductance that ensures a natural commutation to the transistor switches S1, S2, S3, S4 of the opposite potential. The switching-on of one of the transistor switches S1, S2, S3, S4 here always takes place after natural commutation has occurred, when the voltage present at this transistor switch S1, S2, S3, S4 ("zero voltage switching") is approximately 0 V. In particular, the switching operations are carried out in such a way that when one of the transistor switches S1, S2, S3, S4 is switched off, the bridge current at the bridge inductance L has in each case a flow direction and a minimum amplitude, so that the voltage commutates through precisely this bridge current and not through the switching-on of the complimentary transistor (transistor S3 is here complementary to transistor S4, transistor S4 is complimentary to transistor S3, transistor S1 is complimentary to transistor S2, transistor S2 is complimentary to transistor S1). Deviations between the calculated model and the real behavior are corrected by means of a PI current regulator.

In some embodiments, the ZVS ("zero voltage switching") operation can be maintained both at all stationary working points as well when working points change, including for all operating states amongst the three possible relationships between the input and output voltages: U1<U2, U1=U2, U1>U2. As already explained, the input and output voltages U1, U2 are measured. The mean setpoint bridge current value IL_avg_soll and the instantaneous bridge current value Istart1a, Istart1b; Istart2a, Istart2b; Istart3a, Istart3b are specified. The period duration, the switch-on time point and the switch-on duration, and thereby the duty cycle, are determined from these values. The uncertainty related to a parallel shift of the resulting bridge current curve over the switching period of the current triangle resulting from the period duration, the switch-on time point and the switch-on duration by an arbitrary offset can be overcome with the above-described method with the mean setpoint bridge current value IL_avg_soll and the instantaneous bridge current value Istart1a, Istart1b; Istart2a, Istart2b; Istart3a, Istart3b.

What is claimed is:

1. A method for the operation of a bidirectional voltage converter with an input-side half-bridge circuit having respectively a positive-voltage-side and a negative-voltage-side transistor switch connected in series with one another, an output-side half-bridge circuit having respectively a positive-voltage-side and a negative-voltage-side transistor switch connected in series with one another, and a bridge branch having a bridge inductance, the method comprising:
  determining an actual mean bridge current value IL_avg_mess flowing through the bridge branch during a respective subsequent switching cycle T1 of the transistor switches in a respective current switching cycle;
  determining switch-on time points and switch-on durations of the respective transistor switches for the respective subsequent switching cycle T1 using a predefined mean setpoint bridge current value IL_avg_soll;
  switching on the respective transistor switches at the respective switch-on time points and for the respective switch-on durations in the respective subsequent switching cycle T1;
  calculating a current difference ΔI between the actual mean bridge current value IL_avg_mess and the predefined mean setpoint bridge current value IL_avg_soll;
  calculating a duty cycle correction value ΔDC based on the current difference ΔI; and
  determining the switch-on time points and the switch-on durations includes using the calculated duty cycle correction value ΔDC.

2. A method for the operation of a bidirectional voltage converter with an input-side half-bridge circuit having respectively a positive-voltage-side and a negative-voltage-side transistor switch connected in series with one another, an output-side half-bridge circuit having respectively a positive-voltage-side and a negative-voltage-side transistor switch connected in series with one another, and a bridge branch having a bridge inductance, the method comprising:

determining an actual mean bridge current value IL_avg_mess flowing through the bridge branch during a respective subsequent switching cycle T1 of the transistor switches in a respective current switching cycle;

determining switch-on time points and switch-on durations of the respective transistor switches for the respective subsequent switching cycle T1;

switching on the respective transistor switches at the respective switch-on time points and for the respective switch-on durations in the respective subsequent switching cycle T1;

determining values of an instantaneous bridge current Istart1a, Istart1b; Istart2a, Istart2b; Istart3a, Istart3b of a bridge current (IL) in the respective current switching cycle T0, wherein the instantaneous bridge current should flow through the bridge branch at the time at which one of the transistor switches is switched over from a switched-on state into a switched-off state; and determining the switch-on time points and the switch-on durations with the instantaneous bridge current values Istart1a, Istart1b; Istart2a, Istart2b; and Istart3a, Istart3b.

3. The method as claimed in claim 2, wherein the values of the instantaneous bridge current Istart1a, Istart1b; Istart2a, Istart2b; Istart3a, Istart3b depend at least in part on the bridge inductance and charge transfer capacitances of the transistor switches.

4. The method as claimed in claim 2, further comprising:
determining a period duration based at least in part on the values of the instantaneous bridge current Istart1a, Istart1b; Istart2a, Istart2b; Istart3a, Istart3b in the respective subsequent switching cycle T1; and switching on or off the transistor switches in the respective subsequent switching cycle T1 for the period duration.

5. The method as claimed in claim 4, wherein:
determining the switch-on time points and the switch-on durations includes using a predefined mean setpoint bridge current value IL_avg_soll; and
determining the period duration depends at least in part on the actual mean bridge current value IL_avg_mess.

6. A method for the operation of a bidirectional voltage converter with an input-side half-bridge circuit having respectively a positive-voltage-side and a negative-voltage-side transistor switch connected in series with one another, an output-side half-bridge circuit having respectively a positive-voltage-side and a negative-voltage-side transistor switch connected in series with one another, and a bridge branch having a bridge inductance, the method comprising:

determining an actual mean bridge current value IL_avg_mess flowing through the bridge branch during a respective subsequent switching cycle T1 of the transistor switches in a respective current switching cycle;

determining switch-on time points and switch-on durations of the respective transistor switches for the respective subsequent switching cycle T1;

switching on the respective transistor switches at the respective switch-on time points and for the respective switch-on durations in the respective subsequent switching cycle T1;

measuring an input voltage at the input-side half-bridge circuit and an output voltage at the output-side half-bridge circuit in the respective current switching cycle T0;

comparing the input voltage and the output voltage to one another; and determining at least one of: the switch-on time points, the switch-on durations, and the period duration based at least in part on the result of the comparison between the input voltage and the output voltage;

wherein determining the switch-on time points and the switch-on durations includes using a predefined mean setpoint bridge current value IL_avg_soll; the method further comprising:

determining values of an instantaneous bridge current Istart1a, Istart1b; Istart2a, Istart2b; Istart3a, Istart3b in the respective current switching cycle T0, wherein the instantaneous bridge current should flow through the bridge branch at the time at which one of the transistor switches is switched over from a switched-on state into a switched-off state; and determining the switch-on time points and the switch-on durations with the instantaneous bridge current value Istart1a, Istart1b; Istart2a, Istart2b; Istart3a, Istart3b;

wherein, with a relationship between the measured input voltage U1 and the measured output voltage U2:

U2>k1*U1, wherein k1>1 in the subsequent switching cycle T1, the positive-voltage-side transistor switch of the input-side half-bridge circuit is switched on continuously;

the negative-voltage-side transistor switch of the input-side half-bridge circuit is switched off continuously;

the negative-voltage-side transistor switch of the output-side half-bridge circuit is switched on from the beginning of a subsequent switching cycle T1 for a first switch-on duration tein_S4, and switched off for the remaining time of the period duration Tper of the subsequent switching cycle T1; and the positive-voltage-side transistor switch of the output-side half-bridge circuit is switched off from the beginning of switching cycle T1 for the first switch-on duration tein_S4, and switched on for a remaining time of the period duration Tper of the subsequent switching cycle T1;

wherein for the first switch-on duration tein_S4 the following apply:

$$\text{tein\_S4} = \frac{2 \cdot L \cdot (Istart1a - \text{IL\_avg\_soll}) \cdot [U2 \cdot (1 + \Delta DC) - U1]}{U1 \cdot (U1 - U2)},$$

with IL_avg_soll>=0 amperes, or $$\text{tein\_S4} = \frac{2 \cdot L \cdot (Istart1b - \text{IL\_avg\_soll}) \cdot [U1 - U2 \cdot (1 + \Delta DC)]}{U1 \cdot (U1 - U2)},$$

with IL_avg_soll<0 amperes.

7. The method as claimed in claim 6, wherein the period duration Tper for the respective subsequent switching cycle T1 is determined on the basis of the following equations:

$$Tper = \frac{2 \cdot L \cdot U2 \cdot (Istart1a - \text{IL\_avg\_soll})}{U1 \cdot (U1 - U2)},$$

with IL_avg_soll>=0 amperes, or $$Tper = \frac{2 \cdot L \cdot U2 \cdot (\text{IL\_avg\_soll} - Istart1b)}{U1 \cdot (U1 - U2)},$$

with IL_avg_soll<0 amperes.

8. A method for the operation of a bidirectional voltage converter with an input-side half-bridge circuit having respectively a positive-voltage-side and a negative-voltage-side transistor switch connected in series with one another, an output-side half-bridge circuit having respectively a positive-voltage-side and a negative-voltage-side transistor switch connected in series with one another, and a bridge branch having a bridge inductance, the method comprising:

determining an actual mean bridge current value IL_avg_mess flowing through the bridge branch during a respective subsequent switching cycle T1 of the transistor switches in a respective current switching cycle;

determining switch-on time points and switch-on durations of the respective transistor switches for the respective subsequent switching cycle T1;

switching on the respective transistor switches at the respective switch-on time points and for the respective switch-on durations in the respective subsequent switching cycle T1;

measuring an input voltage at the input-side half-bridge circuit and an output voltage at the output-side half-bridge circuit in the respective current switching cycle T0;

comparing the input voltage and the output voltage to one another; and determining at least one of: the switch-on time points, the switch-on durations, and the period duration based at least in part on the result of the comparison between the input voltage and the output voltage;

wherein determining the switch-on time points and the switch-on durations includes using a predefined mean setpoint bridge current value IL_avg_soll; the method further comprising:

determining values of an instantaneous bridge current Istart1a, Istart1b; Istart2a, Istart2b; Istart3a, Istart3b of a bridge current in the respective current switching cycle T0, wherein the instantaneous bridge current should flow through the bridge branch at the time at which one of the transistor switches is switched over from a switched-on state into a switched-off state; and determining the switch-on time points and the switch-on durations with the values of the instantaneous bridge current Istart1a, Istart1b; Istart2a, Istart2b; Istart3a, Istart3b;

wherein, with a relationship between the measured input voltage U1 and the measured output voltage U2:

k2*U1<=U2<=k1*U1 in the subsequent switching cycle T1, the positive-voltage-side transistor switch of the input-side half-bridge circuit and the negative-voltage-side transistor switch of the output-side half-bridge circuit are switched on from the beginning of switching cycle T1 for a second switch-on duration tein_S4, and are switched off for a remaining time of the period duration Tper of a subsequent switching cycle T1, the negative-voltage-side transistor switch of the input-side half-bridge circuit and the positive-voltage-side transistor switch of the output-side half-bridge circuit are switched off from the beginning of the subsequent switching cycle T1 for the second switch-on duration tein_S4, and are switched on for the remaining time of the period duration Tper of the subsequent switching cycle T1, wherein for the second switch-on duration tein_S4 the following apply:

$$tein\_S4 = \frac{2 \cdot L \cdot (IL\_avg\_soll - Istart2a) \cdot [U2 + (U1 + U2) \cdot \Delta DC]}{U1 \cdot U2},$$

with IL_avg_soll>=0 amperes, or $$tein\_S4 = \frac{2 \cdot L \cdot [(U1 + U2) \cdot \Delta DC + U2] \cdot (Istart2b - IL\_avg\_soll)}{U1 \cdot U2},$$

with IL_avg_soll<0 amperes.

9. The method as claimed in claim 8, wherein the period duration Tper for the respective subsequent switching cycle T1 is deteremined on the basis of the following equations:

$$Tper = \frac{2 \cdot L \cdot (IL\_avg\_soll - Istart2a) \cdot (U1 + U2)}{U1 \cdot U2},$$

with IL_avg_soll>=0 amperes, or $$Tper = \frac{2 \cdot L \cdot (Istart2b - IL\_avg\_soll) \cdot (U1 + U2)}{U1 \cdot U2},$$

with IL_avg_soll<0 amperes.

10. A method for the operation of a bidirectional voltage converter with an input-side half-bridge circuit having respectively a positive-voltage-side and a negative-voltage-side transistor switch connected in series with one another, an output-side half-bridge circuit having respectively a positive-voltage-side and a negative-voltage-side transistor switch connected in series with one another, and a bridge branch having a bridge inductance, the method comprising:

determining an actual mean bridge current value IL_avg_mess flowing through the bridge branch during a respective subsequent switching cycle T1 of the transistor switches in a respective current switching cycle;

determining switch-on time points and switch-on durations of the respective transistor switches for the respective subsequent switching cycle T1;

switching on the respective transistor switches at the respective switch-on time points and for the respective switch-on durations in the respective subsequent switching cycle T1;

measuring an input voltage at the input-side half-bridge circuit and an output voltage at the output-side half-bridge circuit in the respective current switching cycle T0;

comparing the input voltage and the output voltage to one another; and determining at least one of: the switch-on time points, the switch-on durations, and the period duration based at least in part on the result of the comparison between the input voltage and the output voltage;

wherein determining the switch-on time points and the switch-on durations includes using a predefined mean setpoint bridge current value IL_avg_soll; the method further comprising:

determining values of an instantaneous bridge current value Istart1a, Istart1b; Istart2a, Istart2b; Istart3a, Istart3b of a bridge current in the respective current switching cycle T0, wherein the instantaneous bridge current should flow through the bridge branch at the time at which one of the transistor switches is switched over from a switched-on state into a switched-off state; and determining the switch-on time points and the switch-on durations with the values of the instantaneous bridge current Istart1a, Istart1b; Istart2a, Istart2b; Istart3a, Istart3b;

wherein, with a relationship between the measured input voltage U1 and the measured output voltage U2:

U2<k2*U1, where k2<1, in the subsequent switching cycle T1,
- the positive-voltage-side transistor switch of the output-side half-bridge circuit is switched on continuously,
- the negative-voltage-side transistor switch of the output-side half-bridge circuit is switched off continuously,
- the positive-voltage-side transistor switch of the input-side half-bridge circuit is switched on from the beginning of a subsequent switching cycle T1 for a third switch-on duration tein_S1, and is switched off for a remaining time of the period duration Tper of the subsequent switching cycle T1, and
- the negative-voltage-side transistor switch of the input-side half-bridge circuit is switched off from the beginning of the subsequent switching cycle T1 for the third switch-on duration tein_S1, and is switched on for the remaining time of the period duration Tper of the subsequent switching cycle T1,
- wherein for the third switch-on duration tein_S1 the following apply:

$$\text{tein\_S1} = \frac{2 \cdot L \cdot (\text{IL\_avg\_soll} - \text{Istart3a}) \cdot (U1 \cdot \Delta DC + U2)}{U2 \cdot (U1 - U2)},$$

with IL_avg_soll>=0 amperes, or $$\text{tein\_S1} = \frac{2 \cdot L \cdot (\text{Istart3b} - \text{IL\_avg\_soll}) \cdot (U1 \cdot \Delta DC + U2)}{U2 \cdot (U1 - U2)},$$

with IL_avg_soll<0 amperes.

11. The method as claimed in claim 10, wherein the period duration Tper for the respective subsequent switching cycle T1 is determined on the basis of the following equations:

$$Tper = \frac{2 \cdot L \cdot U1 \cdot (\text{Istart3a} - \text{IL\_avg\_soll})}{U2 \cdot (U2 - U1)},$$

with IL_avg_soll>=0 amperes, or $$Tper = \frac{2 \cdot L \cdot U1 \cdot (\text{IL\_avg\_soll} - \text{Istart3b})}{U2 \cdot (U2 - U1)},$$

with IL_avg_soll<0 amperes.

* * * * *